UNITED STATES PATENT OFFICE.

JAMES M. RALL, OF ST. LOUIS, MISSOURI, ASSIGNOR TO WILLIAM W. THOMAS, OF SAME PLACE.

IMPROVEMENT IN COMPOSITIONS FOR LIQUID SOAP.

Specification forming part of Letters Patent No. 122,281, dated December 26, 1871.

Specification describing a certain new and useful Composition for Liquid Soap, invented by JAMES M. RALL, of the city and county of St. Louis and State of Missouri.

This invention consists in a compound of the following ingredients to form a liquid soap, viz.: Unslaked lime, forty pounds; sal-soda, forty pounds; borax, four pounds; carbonate of ammonia, one pound; saltpeter, one pound; super-carbonate of soda, one pound; spirits of turpentine, one pint.

The above ingredients are combined with water to form a liquid soap. In making soap for domestic purposes sufficient water is used with the above to make forty gallons. The sal-soda and carbonate of ammonia are preferably dissolved in hot water, when they, with the other ingredients, may be mixed with the balance of the water and stirred, occasionally or continuously, until all are dissolved, when it is fit for use. This soap is useful both as a detergent and a disinfectant.

I am aware that lime, soda, borax, and ammonia have each been used before in soap-compounds; but

What I claim as my invention is—

A liquid soap, composed of quicklime and sal-soda in about equal parts, with a moderate quantity of borax, carbonate of ammonia, saltpeter, and spirits of turpentine, together with sufficient water to retain the whole in solution, as specified.

In testimony of which invention I have hereunto set my hand.

JAMES M. RALL.

Witnesses:
SAML. KNIGHT,
HENRY G. ISAACS. (26)